United States Patent [19]

Mastrovito

[11] 3,817,418

[45] June 18, 1974

[54] THREADED CONTAINER SEAL

[75] Inventor: Donald Mastrovito, Shrewsbury, Mass.

[73] Assignee: Family Products, Inc., Cambridge, Mass.

[22] Filed: Sept. 20, 1972

[21] Appl. No.: 290,746

[52] U.S. Cl............................ 215/40, 150/.5, 215/31, 215/43
[51] Int. Cl............................................ B65d 41/04
[58] Field of Search .......... 215/31, 40, 43 R; 150/.5

[56] References Cited
UNITED STATES PATENTS

| | | | |
|---|---|---|---|
| 2,965,256 | 12/1960 | Yochem | 215/43 R |
| 3,335,923 | 8/1967 | Healy | 215/40 UX |
| 3,428,208 | 2/1969 | Kosar | 215/40 UX |
| 3,727,784 | 4/1973 | Sargent | 215/40 |

*Primary Examiner*—Donald F. Norton
*Attorney, Agent, or Firm*—Wolf, Greenfield & Sacks

[57] ABSTRACT

A container and closure wherein the container has a threaded neck terminating at a top edge. The threaded cap screws onto the neck, and engagement of the top edge of the neck with the cap causes the upper end of the neck to expand outwardly and form a seal between the outer surface of the upper end and a sealing surface on the cap, below the top edge of the container.

6 Claims, 4 Drawing Figures

PATENTED JUN 18 1974 3,817,418

THREADED CONTAINER SEAL

This invention relates to seals for threaded containers and more particularly comprises the seal for blow molded, threaded, plastic bottles.

BACKGROUND OF THE INVENTION

Maximum dimensional control of blow molded, plastic containers is achieved at the outer surface of the container, which is formed in contact with the mold. Wall thickness does not ordinarily effect the outer surface dimensions of blow molded containers, and as those surfaces are not trimmed by cutting tools etc., they are not effected by such operations. On the contrary, the top edges of blow molded containers are trimmed, and because the trimming operation is not precise, the edges are not necessarily flat, parallel, and free of burs or other formations which would effect their dimensions. Consequently, a much more dependable seal may be achieved at the rim of a container when sealing contact is made with the outer surface of the container as opposed to a trimmed edge.

When the container utilizes a threaded cap as a closure, the threads of the cap and container do not necessarily maintain the cap and container coaxial or with their axes parallel to one another. It will be appreciated that if the two are not parallel, the top edge of the container will lack a precise relationship to the inside of the cap even if the edge is itself perfect, and therefore again, a dependable seal cannot be formed between the upper container edge and the cap.

The primary object of the present invention is to provide a dependable seal between the cap and neck of a blow molded, plastic container, without the use of special gaskets etc. or other means which would increase the cost of the container and/or cap.

Another important object of this invention is to provide a container seal which does not require precise trimming or machining of the upper edge of the container.

Another important object of this invention is to provide a container seal which utilizes a surface formed in direct contact with a mold as opposed to a trimmed edge.

To accomplish these and other objects, this invention includes among its features utilization of the outer surface of the container formed in direct contact with the mold, for engagement with a surface of the cap in the formation of a seal. When the cap is tightened onto the container, the rim portion of the container is caused to expand outwardly so that its outer surface engages a sealing surface in the cap.

DETAILED DESCRIPTION

Figure 1:
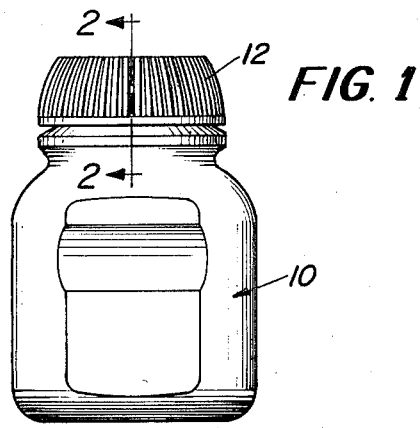
FIG. 1 is a side view of a container and cap constructed in accordance with this invention.

The container 10 and cap 12 shown in the drawings typically are respectively blow molded and injection molded parts made of high impact styrene or other similar inexpensive plastic material. The details of design of the container body and cap form no part of the present invention. The invention rather resides in the cooperative parts of the container and cap which form the seal about the container mouth when the cap is tightened on it.

Figure 2:
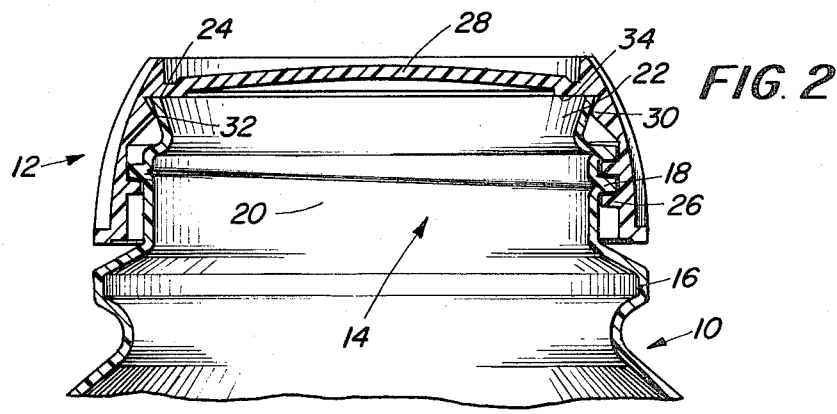
FIG. 2 is an enlarged fragmentary cross sectional view of the container and cap, taken along the section line 2—2 of FIG. 1.

The container 10 as shown in FIG. 2 includes a threaded neck portion 14 above collar 16. In the embodiment shown, threaded neck portion 14 is formed with a continuous single helical thread 18 on the cylindrical portion 20, and the upper end of thread 18 terminates below the rim portion 22. In the preferred form rim portion 22 is upwardly and outwardly flared as is clearly evident in FIG. 2, and it has a top edge 24. As the container 10 is plastic and formed by blow molding techniques, the entire outer surface of the container is precisely formed, and its dimensions are very carefully controlled by virtue of the intimate contact of that surface with the mold itself. While formation of the outer surface is precisely controlled and therefore may be characterized as being very precisely dimensioned, top edge 24 is formed by trimming the container rim portion after the container has been formed in the mold. The trimming operation is not precise as compared to the precision achieved by contact with the mold itself, and therefore, the edge 24 may not be exactly flat or precisely perpendicular to the container axis. Moreover, the edge 24 may have one or more burs on its circumference. Therefore, in accordance with this invention, the edge 24 is not principally relied upon in the formation of the seal between the container neck and cap 12.

Cap 12 is formed with a continuous helical thread 26 which locks with the thread 18 on the neck in the conventional manner. The cap has a top wall 28 and an inwardly extending flange 30 above thread 26, and flange 30 has a relatively sharp inner edge or corner 32 that acts as the cap sealing surface. Edge 32 is spaced downwardly from the peripheral surface 34 of top wall 28, and when the cap is tightened on the bottle neck, top edge 24 of the container neck engages peripheral surface 34. As is evident particularly in FIG. 3, the outer diameter of top edge 24 of the container neck is greater than the inner diameter of surface 32 and consequently, in order for the top edge 24 to clear surface 32, it must be compressed somewhat as the cap is screwed onto the neck. Thus, when the cap is tightened on the container, some increased resistance is encountered as edge 24 engages surface 30, but after the edge has cleared surface 32, the cap may be further turned without any appreciable resistance until the edge 24 actually engages peripheral surface 34. The outer diameter of the rim portion 22 of the container below edge 24 is smaller than the inner diameter of the surface 32, and therefore when edge 24 passes cap sealing surface 32, the cap again turns freely on the threads of the neck.

When edge 24 is forced against peripheral surface 34, the inclination of rim portion 22 causes the rim portion to spread. This spreading action of the rim portion in turn causes outer surface 36 of the rim portion to engage surface 32 of the cap and form a tight seal between those parts. Because the surface 36 is formed in actual contact with the precisely machined mold itself, that surface is very precise, that is, its dimensions are highly predictable. And because molded surface 32 of the cap is similarly very precise, a very dependable seal is provided for each container and cap manufactured. And mass produced containers are readily interchangeable with mass produced caps.

Because rim portion 22 is actually pushed outwardly under the force applied by peripheral surface 34 on top edge 24, tolerances are built into the seal which are not otherwise present. The expanding action of the rim portion will assure the formation of a proper seal even with some variations in container and cap dimensions.

Figure 3:
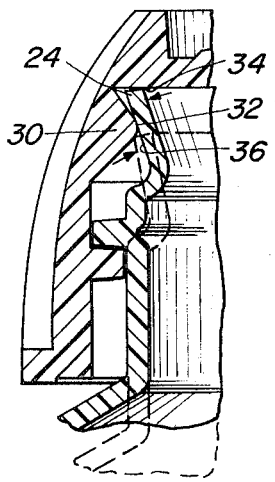
FIG. 3 is an enlarged fragmentary cross sectional view of a portion of the container and cap shown in FIG. 2, and illustrating the manner in which the seal is formed between the cap and container.
Figure 4:
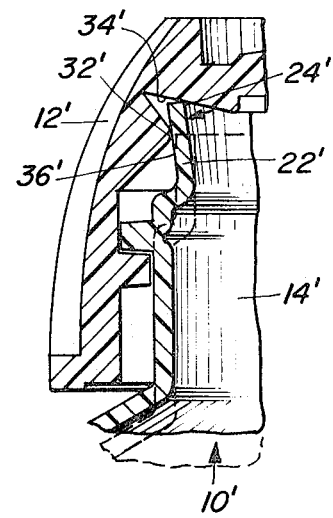
FIG. 4 is a view similar to FIG. 3 and illustrating another embodiment of this invention.

The embodiment of FIG. 4 differs slightly from that of the preferred embodiment shown in FIGS. 1–3. Essentially the differences lie in the configuration of the rim portion of the container and the peripheral surface of the cap. Thus, in FIG. 4, it will be noted that the rim portion 22' of neck 14' of container 10' is cylindrical rather than upwardly and outwardly flared as in the preferred embodiment. And the peripheral surface 34' of cap 12' is upwardly and outwardly inclined with respect to top edge 24' of the container. The outer diameter of rim portion 22' throughout its axial extent is less than the inner diameter of cap sealing surface 32', and therefore as the cap is screwed into the neck 14', there is no resistance encountered before edge 24' actually engages peripheral surface 34'. When edge 24' engages surface 34', the inclination of surface 34' causes rim portion 22' to spread or expand so that its outer surface 36' engages cap sealing surface 32'. Thus, contrary to the arrangement of FIGS. 1–3, the angular position of the peripheral surface 34' causes the rim portion to expand, rather than the inclination or angular orientation of the rim portion itself.

It will be appreciated that the features of the embodiments of FIGS. 1–3 and 4 can be combined into a single embodiment. That is, the inclined surface 34' of the cap of FIG. 4 could be used with the flared rim 22 of the embodiment of FIG. 3 to achieve the same results, namely, the formation of a seal between the outer surface of the rim portion and the sealing surface of the cap with perhaps some additional assurance that the rim portion will be pressed firmly against the cup.

From the foregoing description those skilled in the art will appreciate that modifications may be made of this invention without departing from the spirit. Therefore it is not intended to limit the breadth of this invention to the two embodiments illustrated and described. Rather, it is intended that the scope of this invention be determined by the appended claims and their equivalents.

What is claimed is:

1. A container and closure assembly comprising a container made of a flexible plastic material and having a threaded neck terminating in a top edge, a threaded cap constructed and arranged to be screwed onto the threaded container neck, means defining an inwardly facing sealing surface on the cap which surrounds the neck of the container and which is disposed below the top edge of the neck and above the threaded portion of the neck when the cap is screwed substantially fully onto the neck, and cooperative means formed on the container neck and cap above their respective threaded portions and being responsive to tightening of said cap on said container neck to effect outward expansion of that portion of said neck which is disposed above the threaded region of said neck into sealing engagement with said sealing surface of the cap and form a seal between the container and cap.

2. A container and closure as described in claim 1 further characterized by said neck having an upwardly and outwardly flared rim portion above the threads on the neck and terminating at said top edge, and said cap having a second surface for engaging the top edge and pushing the rim portion outwardly as the cap is tightened on the neck to cause the outer surface of the neck to push against the cap sealing surface.

3. A container and closure as described in claim 2 further characterized by said edge having a larger outer diameter than the inner diameter of the cap sealing surface causing the edge to squeeze by the cap sealing surface when the cap is tightened.

4. A container and closure as described in claim 3 further characterized by the inner diameter of the cap sealing surface being larger than the outer diameter of the surface of the rim portion engaged by the sealing surface until the rim portion is pushed outwardly by the cap.

5. A container and closure as described in claim 1 further characterized by said neck having an upwardly extending rim portion above the threads on the neck and terminating at the top edge, and said cap having a second surface engaging the rim portion and pushing it outwardly as the cap is tightened on the neck to cause the outer surface of the rim portion to push against the cap sealing surface.

6. A container and closure as described in claim 5 further characterized by said second surface on the cap being inclined upwardly and outwardly with respect to the axis of the cap and engaging the edge to force the rim portion against the cap sealing surface.

* * * * *